Nov. 21, 1967     H. K. GEIGER     3,353,683
LONGITUDINAL FLOW SETTLING TANK WITH MOVABLE SLUDGE SHIELD
Filed June 16, 1966     2 Sheets-Sheet 2

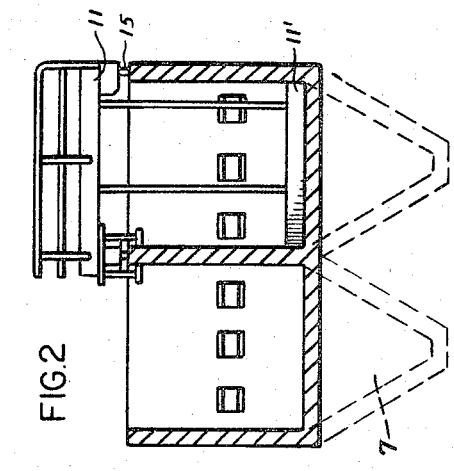
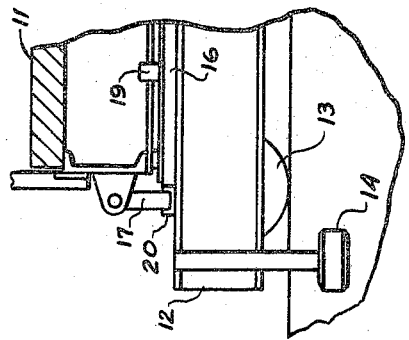
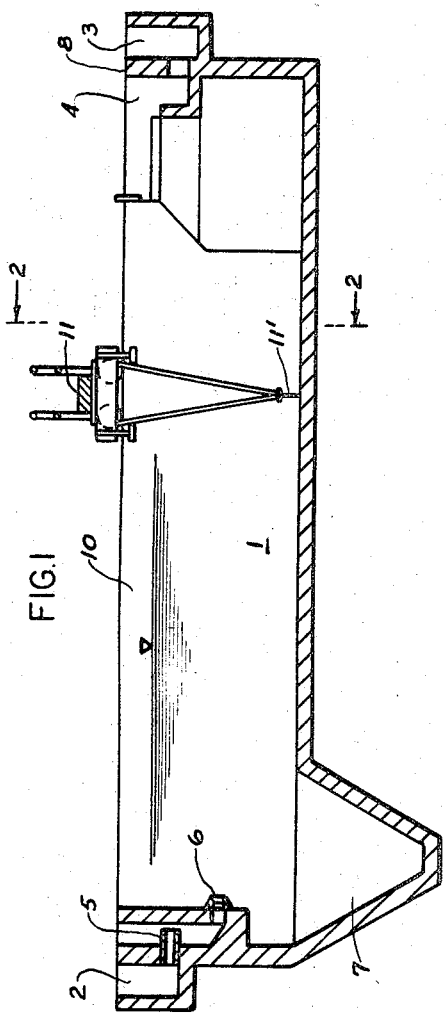
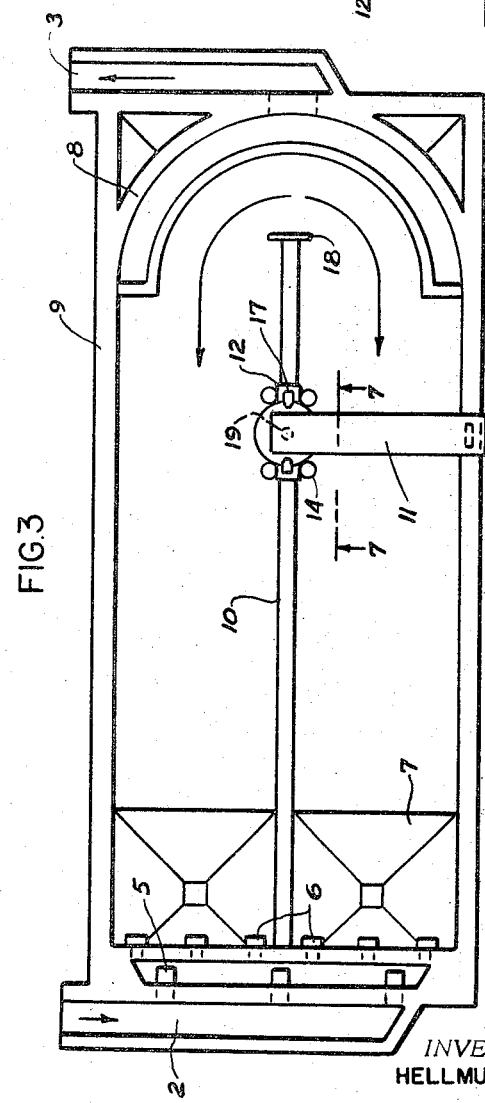

INVENTOR.
HELLMUT GEIGER
BY
H. Edward Meston 3,353,683
LONGITUDINAL FLOW SETTLING TANK WITH
MOVABLE SLUDGE SHIELD
Hellmut Karl Geiger, 1 Hardeckstrasse,
Karlsruhe 75, Germany
Filed June 16, 1966, Ser. No. 559,640
Claims priority, application Germany,
June 18, 1965, G 43,894
6 Claims. (Cl. 210—527)

ABSTRACT OF THE DISCLOSURE

A longitudinal sludge-settling tank having a center wall and at least one semi-circular track with a pivotally mounted sludge shield bridge movable along the center wall and track.

---

Figure 5:
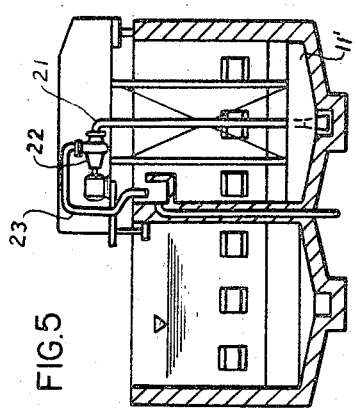

The invention relates to a settling tank for the clarification of liquids. More particularly, it relates to oblong tanks provided with movable sludge pushers.

For the clarification of liquids containing materials capable of settling, tanks preferably are used through which the liquid flows longitudinally and in which the sludge or slime settling on the bottom is consolidated by pusher shields.

In known devices of this kind, bridges have been employed on which the shield is suspended. These bridges move back and forth above the tank. The sediment usually is carried to a sump against the direction of the liquid flow, and the shield is lifted above the liquid surface prior to the return of the bridge.

In instances of heavy sedimentation, such as in activated sludge tanks, the amount of sludge carried in this manner is comparatively small because the return of bridge and shield is lost time and because the quantities of sludge or slime present are large. Moreover, the devices for the forward and backward movement and for lifting and lowering of the shields require considerable mechanical and electrical energy and are potential sources of breakdowns. Round tanks have an advantage in this respect because the shield constantly can rotate in the same direction so that merely a simple drive is needed. However, the construction of such tanks is more expensive than that of longitudinal tanks; utilization of the terrain is poor due to the wedges formed, and, even more important, a uniform passage of the liquid through the tank is considerably more difficult to obtain due to hydraulic peculiarities.

It had previously been proposed for after clarification in longitudinal tanks to remove the sludge while the bridge and shield are moving in either direction and constantly to pump off the sludge in front of the shield. Thereby, correspondingly larger quantities of sludge or slime can be removed, and the lifting device for the shield becomes unnecessary. However, this device has the disadvantage that at the ends of the tank, upon reversal of the shield, practically no sludge is present in front of the shield so that water is pumped off almost exclusively. This nullifies the purpose of the settling tank which is to obtain the best possible uniform sludge concentration.

The instant invention removes the drawbacks described above in such a manner that, in a longitudinal tank with a movable sludge shield, at least one end of the tank is provided with a semicircular track which forms the track for the sludge shield together with a center wall.

The invention now will be further illustrated with reference to the accompanying drawings. However, it should be understood that this is given merely by way of explanation, and not of limitation, and that numerous changes may be made in the details without departing from the spirit and the scope of the invention as hereinafter claimed.

Figure 4:
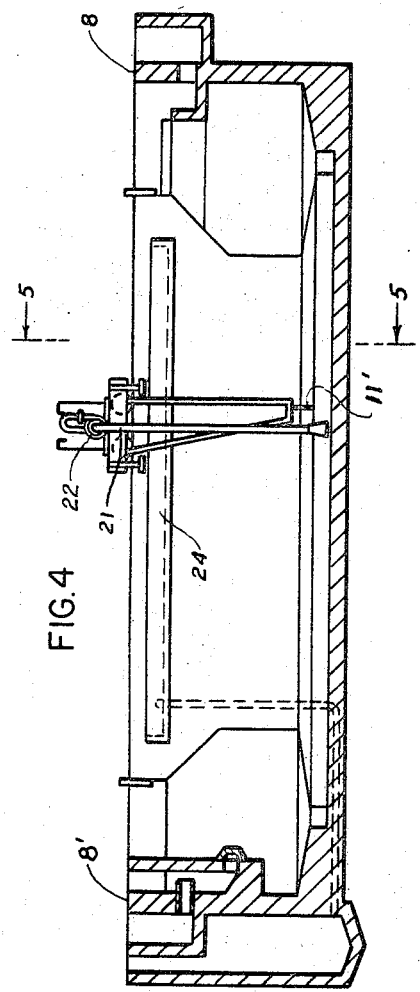
Figure 6:
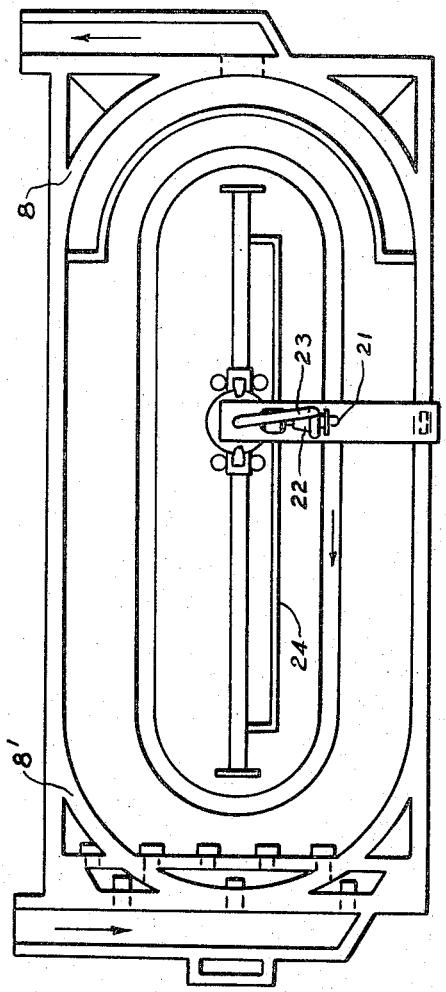

In the drawings,

FIG. 1 is a longitudinal section of a tank with shield;
FIG. 2 is a cross section thereof;
FIG. 3 is a top plan view of the tank with settling sumps;
FIGS. 4, 5 and 6 are corresponding views of a tank as FIGS. 1–3 but without settling sumps;
FIG. 7 is a partial elevational section taken along lines 7—7 of FIG. 3.

Referring now to these drawings, the longitudinal tank 1 through which the liquid flows in longitudinal direction, is provided with an inlet 2 and an outlet 3. The latter has an overflow 4 within the tank. A distributing channel 5 with orifices 6 may be installed in a known manner, parallel to inlet 2, in order to provide even distribution of the liquid, entering from a small cross section, to the entire breadth and height of the tank. Slime or sludge pits or sumps 7 are provided on the inlet side of the tank. At the opposite end of the tank, a semicircular track 8 is disposed which, together with the longitudinal walls 9 and a center wall 10 form the track for the sludge shield. Bridge 11 with shield 11', fastened thereto, is provided at one side with a swiveling bolster 12. The latter runs along center wall 10 by means of carrier wheels 13 and is guided along 10 by guide rollers 14. On the outside of the tank 1, the sludge remover is connected to a drive wheel 15 which is driven by a motor by way of a reducing gear and spur gear transmission. While moving straight ahead, the bridge with swiveling bolster 12 is connected, by means of a flange 16, to latch 17. At the end of the straight run, the guide rollers 14 push against a stop 18, and simultaneously latch 17 is released by means of a lever arrangement (not shown). This terminates the straight run, and the remover turns about pivot 19 of bolster 12 until the latch, by the action of a load spring, engages in notch 20, and the remover with shields begins its return. During the run of the bridge, the sludge and slime lying on the bottom of the tank are pushed into one of the sumps or pits 7. When the edge of the sumps has been reached, the motor is reversed, and sludge removal then is carried out in opposite direction into the other sump.

The embodiment shown in FIGS. 4, 5 and 6 is preferable to use with tanks wherein activated sludge is to be removed. In this embodiment, there are no sumps or pits present, and the tank bottom advantageously slopes slightly toward the center of the tank. The tank has a track 8' on the inlet side, in addition to track 8 at the outlet side, and the bridge with shield always moves in the same direction. The settled sludge is removed by shield 11' which opportunely has an angle of pitch on both sides. The end of suction line 21 of pump 22 is disposed in front of shield 11'. The pump is installed on the top of the bridge. A pressure line 23 is disposed in channel 24 which is fastened to the center wall 10. The sludge is removed from channel 10 by means of a conduit in the center wall and below the tank wall into a pump sump.

In lieu of the movement of the remover, as described, during the straight run and the turn about a pivot at the tank ends by means of a latch, it is possible to install a guide roller with vertical axis, fastened on bridge 11. The guide roller lies against the center wall during the straight run and runs over the same in the end positions whereby turning commences.

The device described is simple and foolproof. The sediment always has sufficient time to settle so that a good concentartion is obtained and the water content of the sludge remains largely uniform. The device combines the advantages of round tanks with those of tanks with longitudinal flow; it requires solely one drive wheel which can be driven directly by a transmission. The center wall improves the water flow and shortens the span width by one-half.

I claim as my invention:

1. A longitudinal flow sludge-settling plant with a movable sludge shield, comprising a longitudinal tank; inlet means for sludge-containing liquid at one end of said tank; outlet means for sludge-free liquid at the opposite end thereof; a center wall disposed in said tank; a bridge and a shield attached thereto at its lower end for moving the sludge, traveling along said center wall; a semicircular track disposed at least at one end of the tank forming, together with said center wall and the side walls of the tank, a turning track for said bridge; means for moving said bridge along said center wall and track; means for securing said bridge on said center wall; means for turning the bridge as it moves along said track, and means for collecting the separated sludge at the bottom of the tank.

2. The plant as defined in claim 1, wherein said means for securing the bridge and the means for turning of the same comprise a swiveling bolster on one side of the bridge; a flange on one side of the center wall; guide rollers on said bridge moving along the center wall; a stop at the end of the center wall above the track; a latch on said bridge engaging said flange during travel of the bridge along the center wall and releasing same when said guide rollers push against said stop.

3. The plant as defined in claim 1, wherein the means for collecting sludge comprises two sumps at the bottom of the tank, and outlet means for said sumps for said sludge.

4. The plant as defined in claim 1, wherein a track is provided at each end of the tank, the bridge turning thereon and always traveling in the same direction; a stop on each end of the center wall; a channel provided along the center wall; a pressure line leading into said channel; and a suction line connected to and cooperating with said pressure line, terminating in front of said shield and removing the sludge through said channel.

5. The plant as defined in claim 4, wherein the shield has an angle of pitch on both of its sides.

6. The plant as defined in claim 4, wherein the tank bottom slopes slightly toward its center.

References Cited
UNITED STATES PATENTS

| | | | |
|---|---|---|---|
| 1,986,573 | 1/1935 | Hardinge | 210—527 |
| 2,339,453 | 1/1944 | Bidwell | 210—195 X |

REUBEN FRIEDMAN, *Primary Examiner.*

J. L. DE CESARE, *Assistant Examiner.*